(12) United States Patent
Nair

(10) Patent No.: US 10,546,321 B2
(45) Date of Patent: Jan. 28, 2020

(54) LENDING OFFERS IN AN ELECTRONIC COMMERCE MARKETPLACE

(71) Applicant: PAYPAL, INC., San Jose, CA (US)

(72) Inventor: Rahul Nair, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 585 days.

(21) Appl. No.: 14/984,499

(22) Filed: Dec. 30, 2015

(65) Prior Publication Data

US 2017/0161783 A1 Jun. 8, 2017

Related U.S. Application Data

(63) Continuation of application No. 14/959,752, filed on Dec. 4, 2015.

(51) Int. Cl.
*G06Q 40/02* (2012.01)
*G06Q 30/06* (2012.01)
*G06Q 30/02* (2012.01)

(52) U.S. Cl.
CPC ....... *G06Q 30/0255* (2013.01); *G06Q 40/025* (2013.01)

(58) Field of Classification Search
CPC .. G06Q 40/025; G06Q 30/0601; G06Q 40/02; G06Q 30/06; G06Q 30/0641
See application file for complete search history.

(56) References Cited

U.S. PATENT DOCUMENTS

| | | | |
|---|---|---|---|
| 2001/0039516 A1* | 11/2001 | Bennett | G06Q 20/20 705/26.8 |
| 2003/0229582 A1* | 12/2003 | Sherman | G06Q 40/025 705/38 |
| 2008/0015954 A1* | 1/2008 | Huber | G06Q 10/087 705/28 |
| 2008/0250026 A1* | 10/2008 | Linden | G06Q 30/02 |
| 2012/0023011 A1* | 1/2012 | Hurwitz | G06Q 20/10 705/39 |
| 2014/0279656 A1* | 9/2014 | Ganesh | G06Q 10/0833 705/333 |
| 2015/0310430 A1* | 10/2015 | Goldstone | G06Q 20/32 705/44 |
| 2016/0063463 A1* | 3/2016 | Min | G06Q 20/12 705/44 |

* cited by examiner

*Primary Examiner* — Hao Fu
(74) *Attorney, Agent, or Firm* — Haynes and Boone, LLP

(57) ABSTRACT

A system and/or method may be provided for providing a financing offer to the user based on a user's browsing session. An example method includes monitoring a browsing session of a user. The method also includes detecting, based on monitoring the browsing session, an action indicating that the user will purchase a product from a merchant during the browsing session. The method further includes providing, based on the action, the user with a user selectable option to accept a financing offer for the purchase of the product. The financing offer is associated with a lender and specifies a set of offer terms. The method also includes in response to a determination that the user has accepted the financing offer, debiting a lender account associated with the lender, crediting a merchant account associated with the merchant, and establishing an agreement of the financing offer between the user and lender.

20 Claims, 10 Drawing Sheets

LENDING OFFERS IN AN ELECTRONIC COMMERCE MARKETPLACE

CROSS-REFERENCE TO RELATED APPLICATION

The present application is a continuation application of and claims priority to U.S. patent application Ser. No. 14/959,752, filed Dec. 4, 2015, which is incorporated by reference herein.

BACKGROUND

Field of the Invention

The present disclosure generally relates to systems and methods for providing a financing offer based on a user's browsing session.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal®, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Some users may need to borrow money to make on-line purchases, and the only conventional ways to do so are through a credit card (which may have high fees), a loan from a bank (which is a time consuming process), or a loan from the merchant making the sale (which may require the user to apply for a credit card). It may be disadvantageous for the user to go through these conventional ways. For example, the user may have bad credit and be denied a credit card. In another example, the user may have reached her credit card limit and is thus unable to charge anything to her credit card. It may be desirable to overcome these disadvantages.

Figure 1:
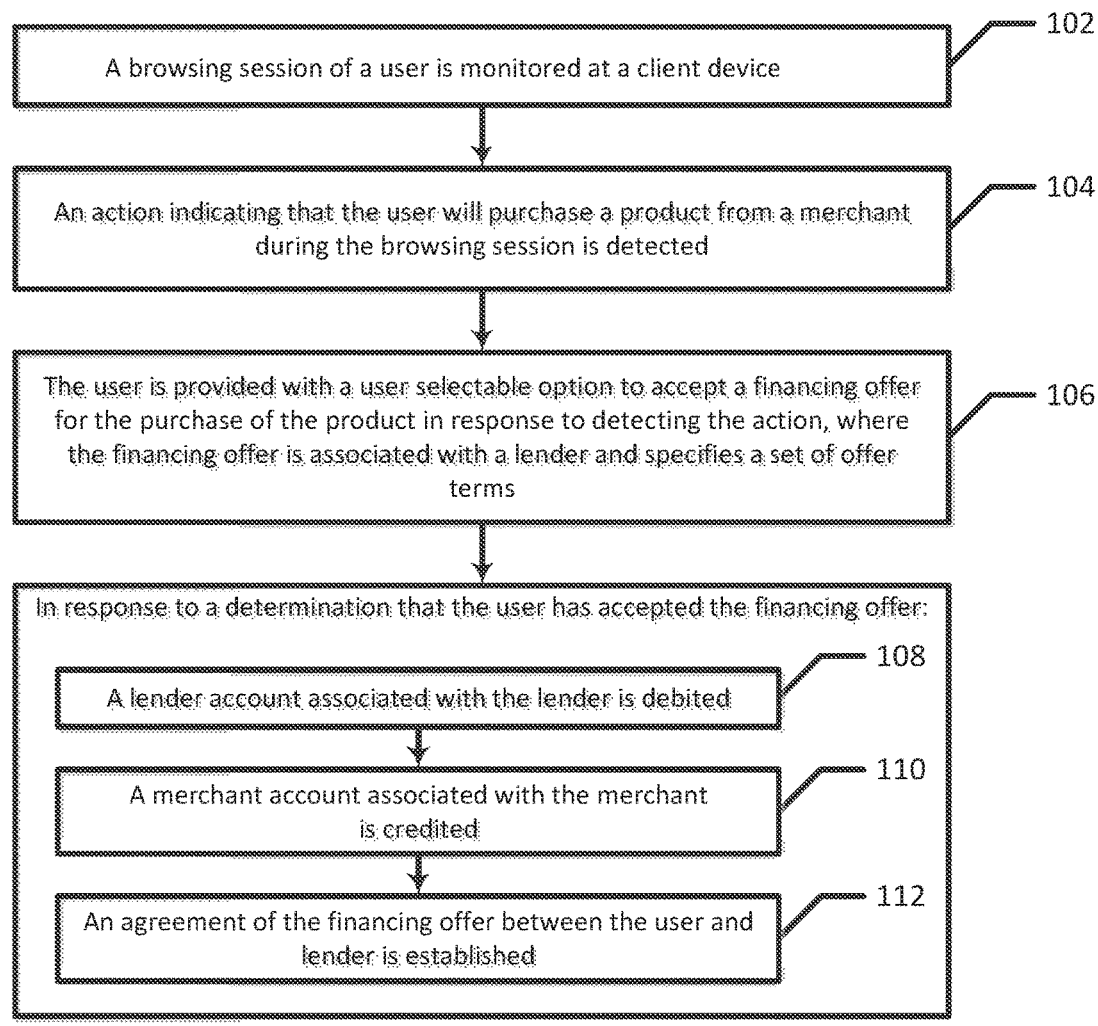
FIG. 1 is a flowchart illustrating an embodiment of a method of providing a financing offer based on a user's browsing session.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

I. Overview
II. Example Method
III. Example Webpages
   A. Financing Offer Linked to Products of a Particular Type
   B. Financing Offer Linked to Particular Merchants
   C. Financing Offer Linked to Particular Buyers
IV. System Architecture
V. Example Computing Systems

I. Overview

The present disclosure provides techniques for providing a financing offer to a user based on the user's browsing session. A user may browse merchant websites with the intention of buying a product (e.g., an item and/or service) from the website. It may be desirable to provide the user with a financing offer for the purchase of the product. In some examples, the user's browsing session may be monitored. The browsing session may include a plurality of merchant websites visited and/or otherwise indicated of interest to the user. The user may perform one or more actions indicating that the user will purchase a product from the merchant (e.g., via the merchant website) during the browsing session.

In response, a lender may provide a financing offer to the user. In some examples, the lender specifies the offer terms, buyer eligibility criteria, seller eligibility criteria, and/or product eligibility criteria that must be satisfied before the lender will provide a particular financing offer to the user. The lender may be a user who also purchases products from merchant websites. For example, if the user is searching for products on an electronic commerce website, the lender may be a regular buyer who purchases products from merchants via the electronic commerce website. In this example, the user credentials that the lender uses to specify offer terms, buyer eligibility criteria, seller eligibility criteria, and/or product eligibility criteria of a financing offer may be the same as the user credentials that the lender uses as a regular buyer to purchase products from merchants via the electronic commerce website.

If an action indicating that the user will purchase a product from a merchant website during the browsing session is detected and the appropriate criteria specified by the lender is satisfied, the user is provided with a user selectable option to accept a financing offer for the purchase of the product. The financing offer includes a set of offer terms that may be specified by the lender.

Unless specifically stated otherwise, as apparent from the following discussion, it is appreciated that throughout the description, discussions utilizing terms such as "receiving", "sending", "storing", "monitoring", "determining", and "detecting", "providing," "debiting," "crediting," "establishing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example Method

FIG. 1 is a flowchart illustrating an embodiment of a method 100 of providing a financing offer based on a user's browsing session. Method 100 is not meant to be limiting and may be used in other applications other than those discussed below. Method 100 includes blocks 102-112.

In a block 102, a browsing session of a user is monitored at a client device. The user may navigate from website to website during a browsing session and browse a plurality of websites for products (e.g., goods or services) to purchase. In an example, the user uses a client device having a browser application that may be used to provide a convenient interface to permit the user to browse information available over a network. In some embodiments, the browser application may be implemented as a Web browser configured to view information available over the Internet. The client device may also include one or more applications that may be used, for example, to provide client-side processing for performing desired tasks in response to operations selected by the user. In an example, a browser plug-in monitors the browsing session of the user. The browsing session may include a plurality of websites, which may include one or more merchant websites. The user may interact with multiple merchant websites and be interested in purchasing a product from one or more merchant websites. If the user is getting ready to purchase a product from a merchant via its website, the user may perform one or more actions indicating that the user is about to make a purchase.

In a block 104, an action indicating that the user will purchase a product from a merchant during the browsing session is detected. In an example, a browser plug-in detects, based on monitoring the user's browsing session, an action indicating that the user will purchase a product from a merchant website during the browsing session. In some examples, the action indicating that the user will purchase a product from a merchant website during a browsing session may be an action indicating that the user is interested in the product. The user may indicate interest in a product by, for example, selecting the product displayed on the website to find out more information about the product, performing a search for the product on the merchant website, or requesting information about the product from the merchant website. For example, the merchant website may display a user selectable option on a webpage that allows the user to communicate with a customer service representative associated with the merchant website to answer the user's questions about the product.

In another example, an action indicating that the user will purchase the product from the merchant website during the browsing session may be the user placing the product in a virtual shopping cart of the merchant website. The merchant website may provide a virtual shopping cart feature, which provides a user interface for the user to shop at online stores and keep track of which products are of interest to the user. The user may place product offerings of the merchant website into the virtual shopping cart and proceed to "check out," at which point the user may pay for the products in the virtual shopping cart. These are examples, and other actions indicating that the user will purchase the product from the merchant website during the browsing session are within the scope of the present disclosure.

In a block 106, the user is provided with a user selectable option to accept a financing offer for the purchase of the product in response to detecting the action, where the financing offer is associated with a lender and specifies a set of offer terms. In an example, a browser plug-in provides the user with a user selectable option to accept a financing offer for the purchase of the product in response to the detected action, where the financing offer is associated with the lender and specifies a set of offer terms. The lender may specify which products, one or more buyer eligibility criteria, and/or one or more merchant eligibility criteria that must be satisfied in order for the lender to provide a financing offer to a user. The user selectable option to accept the financing offer may, for example, be displayed on the webpage or on a side of the webpage that includes information about the purchase of the product.

A lender may be associated with a lender account and provide one or more financing offers to one or more users. The lender may specify criteria that must be satisfied by the product, potential buyer, and/or potential seller before the lender will offer a financing offer to the potential buyer for the purchase of the product from the merchant website. In some examples, a browser plug-in accesses the one or more criteria specified by the lender and determines whether the purchase of the product by the user satisfies the one or more criteria. In some examples, the lender links the financing offer with products of a particular type (e.g., the lender may agree to finance purchases of green energy products). The lender may specify one or more criteria that the product must satisfy in order for the lender to provide a financing offer to the user for the purchase of the product. It may be determined whether the product that the user is about to purchase from the merchant website is of the particular type. The user selectable option to accept the financing offer may be provided to the user in response to a determination that the product from the merchant website is of the particular type. In specific examples, the lender may be passionate about particular products and want to incentivize users to buy them by offering financing for these types of products. For example, the lender may be passionate about the environment and provide potential buyers with a financing offer for the purchase of solar panels. In such an example, if the browser plug-in detects an action indicating that the user will purchase solar panels from any of the browsed merchant websites during the browsing session, the browser plug-in provides the user with a user selectable option to accept a financing offer in association with the purchase of the solar panels. The lender may also specify additional criteria.

In some examples, the lender links the financing offer with one or more buyer eligibility criteria. The lender may specify one or more buyer eligibility criteria that the user must satisfy in order for the lender to provide a financing offer to the user for the purchase of a product. It may be determined whether the user satisfies the one or more buyer eligibility criteria specified by the lender. The user selectable option to accept the financing offer may be provided to the user in response to a determination that the user satisfies the one or more buyer eligibility criteria specified by the lender. In some examples, the lender may be wary of lending money to high-risk users. To assuage the lender's wariness, the buyer eligibility criteria may specify at least one of a repayment history of the user, a purchase volume of the user, and/or transaction feedback of the user. In some examples, the lender is passionate about a cause such as the environment. In reference to the above example, the lender may specify that the potential buyer must be located within a particular geographical region because the lender desires to incentivize people in her community (or other communities) to buy solar panels. The user's location may be determined based on the user's Internet Protocol (IP) address, location specified by global positioning system (GPS) from the user's mobile phone, her mailing address as typed into a "mailing address" field, etc. The lender may also specify additional criteria.

In some examples, the lender links the financing offer with one or more merchant eligibility criteria. The lender may specify one or more merchant eligibility criteria that a merchant must satisfy in order for the lender to provide a financing offer to the user for the purchase of a product from the merchant. It may be determined whether the merchant satisfies one or more merchant eligibility criteria specified by the lender. The user selectable option to accept the financing offer may be provided to the user in response to a determination that the merchant satisfies the one or more merchant eligibility criteria specified by the lender. In some examples, the lender is wary about lending money to users to buy products from merchants who are not well established. For example, the merchant may have a phony website and display products on a website that the merchant has no intention of mailing to the user. In another example, the merchant may provide bad customer service and the lender may desire to not associate itself with this merchant. To assuage the lender's wariness, the merchant eligibility criteria may specify at least one of a sales volume of the merchant, transaction feedback of users (e.g., feedback from users who have purchased from the merchant), and a minimum amount of time in which the merchant has been selling the product to consumers. The longer the merchant has been transacting business, the more comfortable the lender may be with lending money to the user for purchasing the merchant's products. The lender may also specify additional criteria.

The lender may be a third party to a transaction between a seller and a buyer. For example, the lender may be a different entity than the seller and the buyer. In response to a determination that the user has accepted the financing offer, blocks 108, 110, and 112 may be executed. In block 108, the lender account is debited. In block 110, a merchant account associated with the merchant is credited. In block 112, an agreement of the financing offer between the user and lender is established. The financing offer may specify a set of offer terms set forth by the lender and that must be agreed upon by the user if the user desires to accept the lender's financing offer. The browser plug-in may establish an agreement for the financing offer between the user and lender in response to a determination that the user has accepted the lender's financing offer. The lender may include a set of offer terms in the financing offer. For example, the financing offer may specify a schedule of payments from the user's account to the lender's account (e.g., the creation of an automatic payment from the user's account to the lender's account for a set amount every month).

It is understood that one or more of the blocks of method 100 described herein may be omitted, combined, or performed in a different sequence as desired. It is also understood that additional processes may be performed before, during, or after blocks 102-112 discussed above. For example, one or more offer terms of the set of offer terms may be monitored to determine whether an offer term of the set of offer terms has been repudiated. In some examples, the financing offer includes a penalty clause for repudiation of an offer term of the set of offer terms. In response to a determination that the offer term has repudiated, the penalty clause may be enforced. For example, a penalty amount may be debited from the user's account and credited to the lender's account.

In some examples, the merchants associated with the merchant websites cooperate because it is in their best interests to allow lenders to provide potential buyers with financing offers to purchase products from them. For example, a merchant website may provide a set of application programming interfaces (APIs) that a browser plug-in may interact with to communicate with the merchant website. For example, the merchant website may provide the browser plug-in with an indication that the user has placed a particular product into the merchant website's virtual shopping cart.

Although the above description describes a browser plug-in as monitoring a browsing session of a user, detecting an action indicating that the user will purchase a product from a merchant (e.g., via the merchant's website) during the browsing session, and providing the user with a user selectable option to accept a financing offer for the purchase of the product in response to the detected action, it should be understood that this is not intended to be limiting, and other components may perform these actions. For example, transactions may take place with the aid of an electronic commerce website provided by, for example, PayPal®, Inc. of San Jose, Calif. Such electronic commerce website can make transactions easier and safer for the parties involved. Purchasing with the assistance of an electronic commerce website from the convenience of virtually anywhere using a mobile device is one main reason why on-line and mobile purchases are growing very quickly.

An electronic commerce website may match buyers, sellers, and lenders together to complete a purchase transaction. For example, the electronic commerce website may allow multiple merchants to sell their products and multiple buyers to buy products via the electronic commerce website. In some examples, the electronic commerce website monitors the browsing session of a user and detects, based on monitoring the user's browsing session, an action indicating that the user will purchase a product from a merchant website during the browsing session. The electronic commerce website may provide, based on the detected action, a user selectable option to accept a financing offer for the purchase of the product to the user.

The electronic commerce website may store information about a merchant and a merchant account associated with the merchant. The merchant may sell one or more products via the electronic commerce website. The electronic commerce website may credit a merchant's account when the merchant sells a product on the electronic commerce website. Additionally, the electronic commerce website may store information about the user and a user account associated with the user. The user may browse products that are sold by merchants via the electronic commerce website and purchase one or more products from one or more merchants. The electronic commerce website may debit a user's account when the user buys a product on the electronic commerce website.

Electronic commerce websites usually limit a transaction to two parties, the buyer and the seller. People typically borrow money from their friends or family members who know them. It may be advantageous to introduce a buyer as a lender in the electronic commerce website. The electronic commerce website may provide an environment in which users (who may be either buyers or lenders) may also provide financing offers to other users of electronic commerce website. As discussed, a lender may be a buyer who typically buys products using the electronic commerce website, but who also will lend money to other users to buy products using electronic commerce websites. For example, the lender may be a regular buyer who purchases products from merchants via the electronic commerce website. The electronic commerce website may store information about a lender and a lender account associated with the lender. In some examples, the lender's account may be the same as the account that the lender normally uses as a buyer.

The electronic commerce website provides a safe environment for debiting the lender's account and crediting the merchant's account. In an example, the lender may finance the total cost of the product and require the user to pay the lender back in increments. In response to a determination that a user has accepted a financing offer from the lender for purchase of a product from a merchant, the lender's account is debited by a first amount and the merchant's account is credited by the first amount. In another example, the lender may finance a portion of the total cost of the product and the financing offer may require that the user provide a down payment to pay for a portion of the product's costs. In such an example, in response to a determination that the user has accepted the financing offer from the lender for purchase of a product from a merchant, the lender's account is debited by a first amount, the merchant's account is credited by a second amount, and the user's account is debited by a third amount. The sum of the first and third amounts may be the same or greater than the second amount (depending on the interest rate or any applicable fees specified in the financing offer).

III. Example Webpages

A. Financing Offer Linked to Products of a Particular Type

Figure 2:
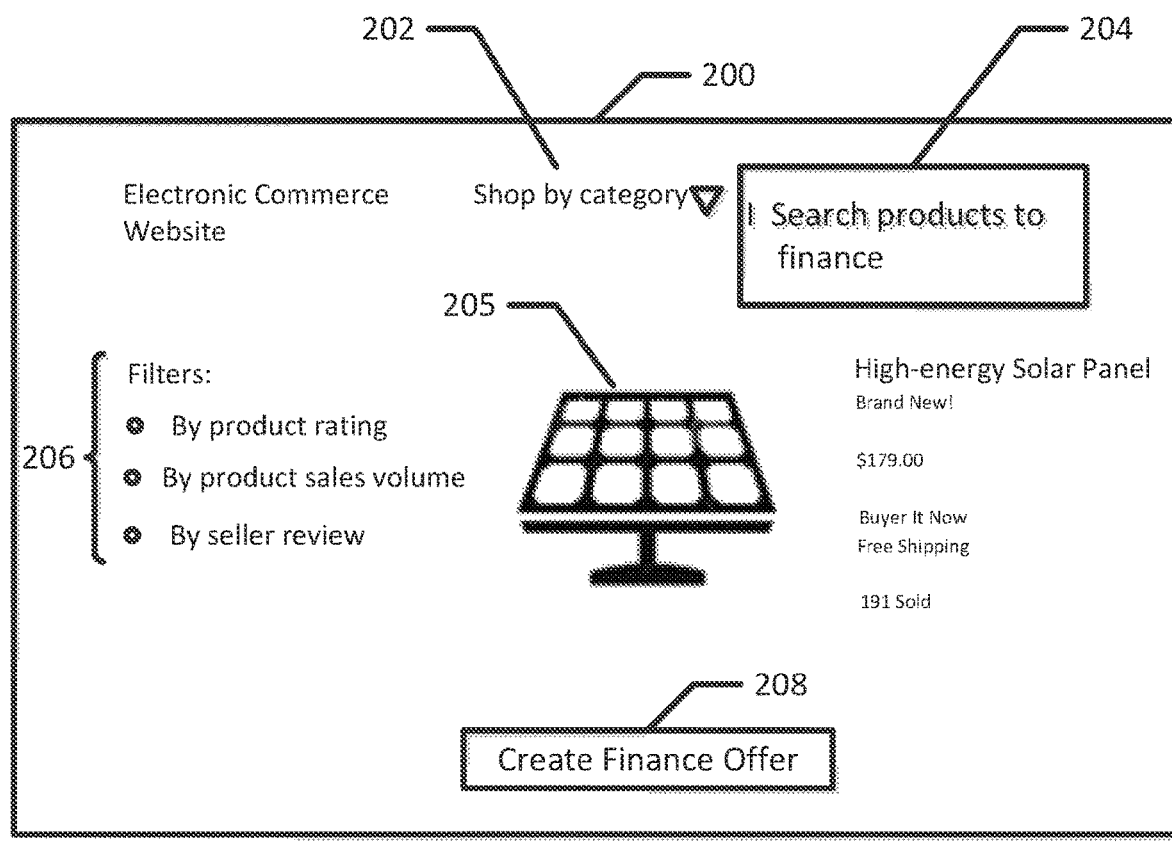
FIG. 2 is an embodiment of a webpage provided by an electronic commerce website to a lender to allow the lender to search for products for which to provide financing offers to users.

A lender may link a financing offer to particular products or products of a particular type. FIG. 2 is an embodiment of a webpage 200 provided by an electronic commerce website to a lender to allow the lender to search for products for which to provide financing offers to users. The lender may login into the electronic commerce website by providing the lender's username and password. In some examples, the username and password entered by the lender into the electronic commerce website's login screen is the same username and password that the lender uses to log into the electronic commerce website as a buyer to purchase products (e.g., a payment account associated with the user and used to fund purchases may also be used as a lender account that is associated with that user and used to lend money to other users).

The lender may search for and select products that the lender desires to provide financing offers for to users. As illustrated on webpage 200, the electronic commerce website may provide the lender with an option 202 to search by category. The lender may select the arrow corresponding to option 202 and select a category (e.g., home improvement, apparel, etc.). Additionally, the lender may search for a product by typing the name of the product or product's description (e.g., green energy) into a search box 204. The lender may be aware of popular products that are selling in high quantities in the marketplace, may wish to invest in a product that the lender believes will be very popular, or may be passionate about particular products. In an example, the lender may have typed "solar panels" into search box 204 and been provided with webpage 200, which displays a high-energy solar panel product 205. The lender may select this product and create a financing offer for users desiring to purchase high-energy solar panel product 205. In another example, rather than simply offer a financing offer to help the user in purchasing the product, the lender may offer to pay a portion of the cost of the product without seeking reimbursement from the user for that portion. A lender may decide to pay a portion of the cost of the product or finance the purchase of the product because the lender is passionate about the product and wants to incentivize others to purchase the product, as a way to advertise for the lender's business, or other reasons.

Additionally, the electronic commerce website may provide the lender with options 206 to filter the lender's product searches. In some examples, if a search for particular products returns too many products, the lender may use options 206 to further narrow down a list of products for which the lender desires to provide financing. As illustrated by options 206, the lender may search for products to provide financing offers for by product rating, product sales volume, seller review, and/or other options A product rating provides the lender with information about how buyers have rated the product. The lender may determine the likelihood of other users buying this product depending on its rating. The higher a product's rating, the more likely the lender may provide a financing offer for the purchase of the product.

A product sales volume provides the lender with information about how much of the product has been sold. If the product sales volume number is high, the lender may determine that this product is a popular product and well-received in the marketplace. In some embodiments, the higher a product's sales volume, the more likely the lender may be to provide a financing offer for the purchase of the product. Seller reviews provide the lender with information about merchants that sell the product, as well as how the products operate. For example, a merchant that provides good customer service may receive positive reviews compared to a merchant that does not provide good customer service. In another example, by reading the seller reviews, the lender may be aware of particulars regarding a product in terms of packaging and difficulty in mailing the product without it breaking. The better the seller reviews, the more likely the lender may provide a financing offer for the purchase of the product.

Once the product the lender is interested in offering financing for is displayed on the webpage, the lender may select a product or product type and select a user selectable option "Create Finance Offer" 208. In response to a selection of user selectable option "Create Finance Offer" 208, the electronic commerce website allows the lender to create a financing offer for one or more users desiring to purchase the specified product (e.g., high-energy solar panel 205) or desiring to purchase a product of the particular type displayed on webpage 200 (e.g., any solar panel or green energy product that produces energy).

Figure 3:
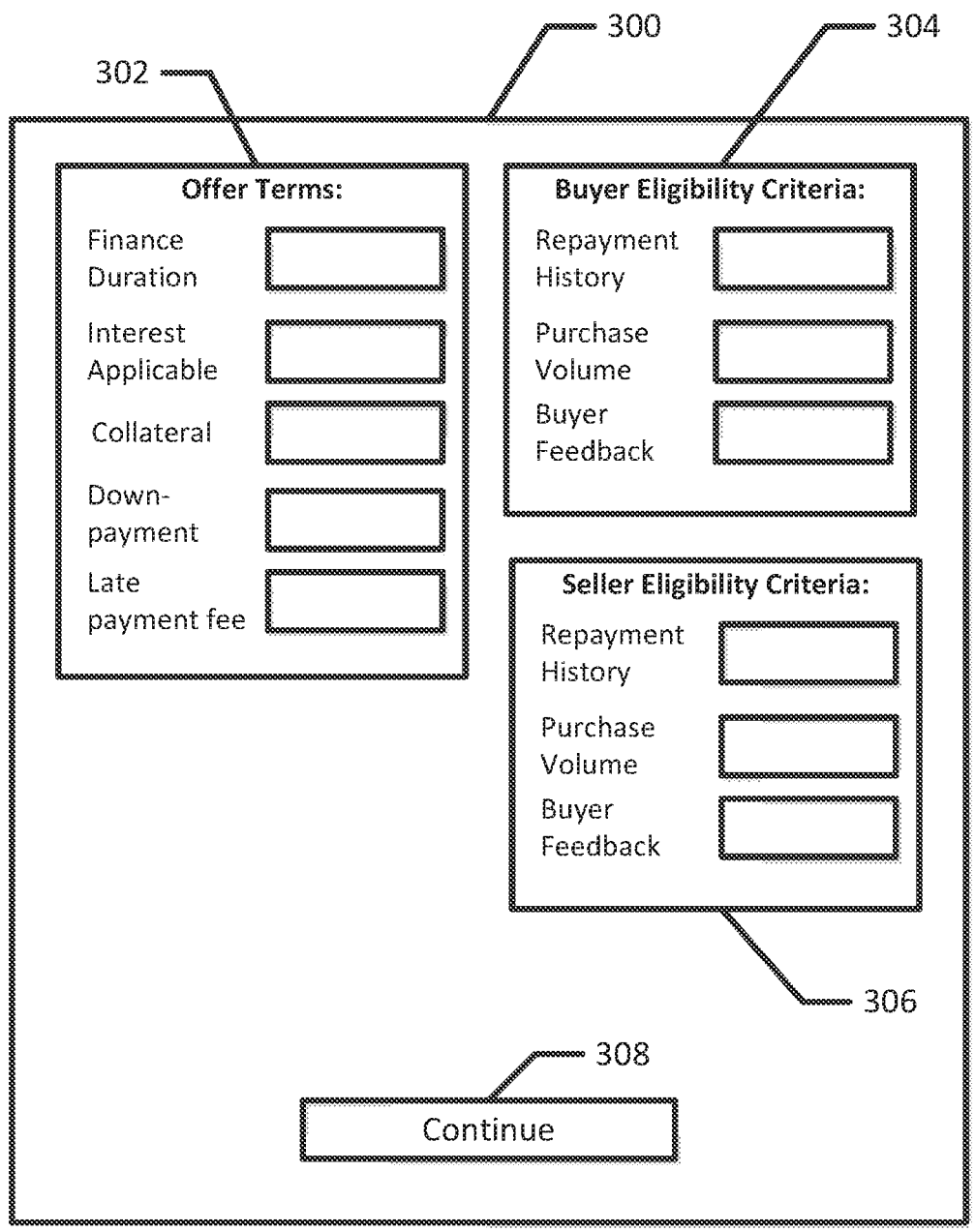
FIG. 3 is an embodiment of a webpage provided by an electronic commerce website to a lender to allow the lender to specify one or more offer terms, buyer eligibility criteria, and/or seller eligibility criteria for providing financing offers to users.

FIG. 3 is an embodiment of a webpage 300 provided by an electronic commerce website to a lender to allow the lender to specify one or more offer terms, buyer eligibility criteria, and/or seller eligibility criteria for providing financing offers to users in response to the selection of user selectable option "Create Finance Offer" 208 on webpage 200 by a lender. Webpage 300 displays a set of offer terms 302, a set of buyer eligibility criteria 304, and a set of seller eligibility criteria 306 that the lender may specify in the financing offer. The lender may carve out different offer terms for different users based on the values entered into set of offer terms 302, a set of buyer eligibility criteria 304, and/or a set of seller eligibility criteria 306.

Set of offer terms 302 includes finance duration, interest applicable, collateral, down-payment, and late payment fee fields. The lender may type values into these fields to specify offer terms of the financing offer. For example, the lender may enter into the finance duration field a timeframe in which the buyer has to pay the lender back an agreed upon amount associated with the financing offer (e.g., 12 months), enter into the interest applicable field an interest rate that the lender desires to charge the buyer for accepting the financing offer, enter into the collateral field any assets that the lender requires the buyer to provide for accepting the financing offer, enter into the down-payment field a dollar amount that the lender requires the buyer to provide for the purchase of the product out of the buyer's own pocket, and/or enter into the late payment field a penalty amount that the buyer agrees to pay if the buyer is late in a pay schedule agreed upon by the buyer and lender.

Set of buyer eligibility criteria 304 includes repayment history, purchase volume, and buyer feedback fields. For example, the lender may enter into the repayment history field a minimum score (e.g., 4 stars/5 stars) that the user must have in order for the lender to provide a financing offer to the buyer. The repayment history field may indicate whether the user has paid back previous loan(s), whether the user was on time in paying back the previous loan(s), whether the user currently has loan(s), whether the user is on time in paying back those loan(s), etc. The better a user's repayment history score, the more likely the lender may provide a financing offer for the purchase of the product to the user. The lender may enter into the purchase volume field a minimum number of transactions that the user must have been a buyer in in order for the lender to provide a financing offer to the user. The higher a user's purchase volume, the more active the user has been on the electronic commerce website and more likely the lender may provide a financing offer for the purchase of the product to the user. The lender may enter into the buyer feedback field a minimum score (e.g., 3.5 stars/5 stars) that the user must have in order for the lender to provide a financing offer to the user. For example, lenders and/or sellers may be able to rate a user and provide feedback about their experience with the user in completing one or more transactions (e.g., whether the user paid on time or was responsive to questions). The better a user's buyer feedback, the more likely the lender may provide a financing offer for the purchase of the product to the user.

Set of seller eligibility criteria 306 includes repayment history, purchase volume, and buyer feedback fields. A seller may take part in transactions as a buyer using the electronic commerce website. For example, the seller may purchase products from other sellers using the electronic commerce website and have taken out one or more loans to do so. The lender may enter into the repayment history field of set of seller eligibility criteria 306 a minimum score (e.g., 4 stars/5 stars) that the seller of a product must have in order for the lender to provide a financing offer to a buyer to purchase a product from the seller. A seller may also be referred to as a merchant. The repayment history field may indicate whether the seller has paid back previous loan(s), whether the seller was on time in paying back the previous loan(s), whether the seller is paying back any current loan(s), whether the seller is on time in paying back the current loan(s), etc., as a buyer and borrower. The better a seller's repayment history score, the more likely the lender may provide a financing offer for the purchase of the product from the seller.

The lender may enter into the purchase volume field a minimum number of transactions that the seller must have been a buyer in in order for the lender to provide a financing offer to the user for purchasing a product from the seller. The higher a seller's purchase volume as a buyer, the more active the user has been on the electronic commerce website and more likely the lender may provide a financing offer for the purchase of the product from the seller. The lender may enter into the buyer feedback field a minimum score (e.g., 3.5 stars/5 stars) that the seller must have in order for the lender to provide a financing offer to the user for purchasing a product from the seller. The better a seller's buyer feedback, the more likely the lender may provide a financing offer for the purchase of the product from the seller. After the lender is finished with filling in the applicable fields, the lender may select a user selectable option "Continue" 308. In response to a selection of user selectable option "Continue" 308, the electronic commerce website allows the lender to create a financing offer based on particular products in accordance with set of offer terms 302, set of buyer eligibility criteria 304, and/or set of seller eligibility criteria 306.

B. Financing Offer Linked to Particular Merchants

Figure 4:
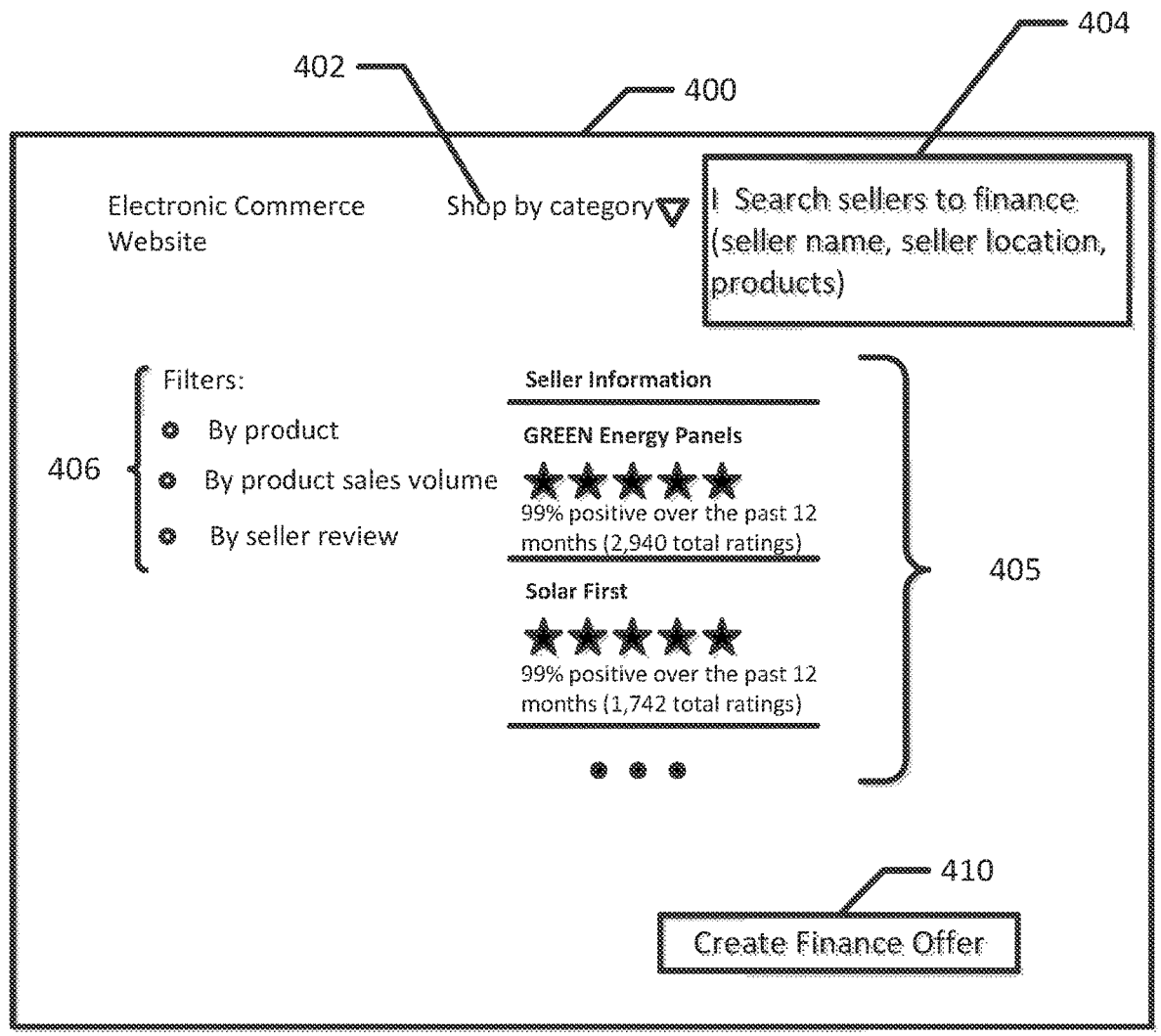
FIG. 4 is an embodiment of a webpage provided by an electronic commerce website to a lender to allow the lender to search for one or more merchants that the lender desires to provide financing offers to for users buying from these merchants.

A lender may link a financing offer to particular merchants. FIG. 4 is an embodiment of a webpage 400 provided by an electronic commerce website to a lender to allow the lender to search for one or more merchants whose customers the lender desires to provide financing offers. As illustrated on webpage 400, the electronic commerce website may provide the lender with an option 402 to search by category. The lender may select the arrow corresponding to option 402 and search for merchants based on a category (e.g., home improvement, apparel, etc.) of products sold by the merchants.

Additionally, the lender may search for a merchant by typing the name of the merchant, location of the merchant, and/or products sold by the merchant into a search box 404. The lender may be aware of popular merchants that are selling high quantities of products or high quality products in the marketplace, may wish to invest in a merchant that the lender believes will be very popular, and/or may be passionate about helping particular merchants sell products by financing the sale of their products. In an example, the lender may have typed "solar panels" into search box 404 and been provided with webpage 400, which displays a list of merchants 405. List of merchants 405 identifies merchants selling high-energy solar panel products. For example, a first merchant identified in list of merchants 405 is Green Energy Panels, which has 5 stars out of 5 stars, a 99% positive rating over the past 12 months, and 2,940 ratings from buyers. A second merchant identified in list of merchants 405 is Solar First, which also has 5 stars out of 5 stars, a 99% positive rating over the past 12 months, and 1,742 ratings from buyers. The lender may select one or more of these merchants identified in list of merchants 405 and create a financing offer for users desiring to purchase products from these selected merchants.

Additionally, the electronic commerce website may provide the lender with options 406 to filter the lender's merchant searches. In some examples, if a search for particular merchants returns too many merchants, the lender may use options 406 to further narrow down the list of merchants. As illustrated by options 406, the lender may search for merchants that are selling products on electronic commerce website by product, product sales volume, and/or seller review. A search by product provides the lender with information about merchants that are selling those particular products (e.g., list of merchants 405 selling solar panels). A search by product sales volume may provide the lender with information about the top selling merchants on the electronic commerce website and how many products these merchants sell per time period (e.g., per week or month, etc.). The higher the product sales volume number that is associated with a merchant, the more likely the lender may provide a financing offer for products purchased from this merchant.

The lender may select one or more merchants of list of merchants 405 and select a user selectable option "Create Finance Offer" 410. In response to a selection of user selectable option "Create Finance Offer" 410, the electronic commerce website allows the lender to create a financing offer for one or more users desiring to purchase products from the selected merchant(s).

Figure 5:
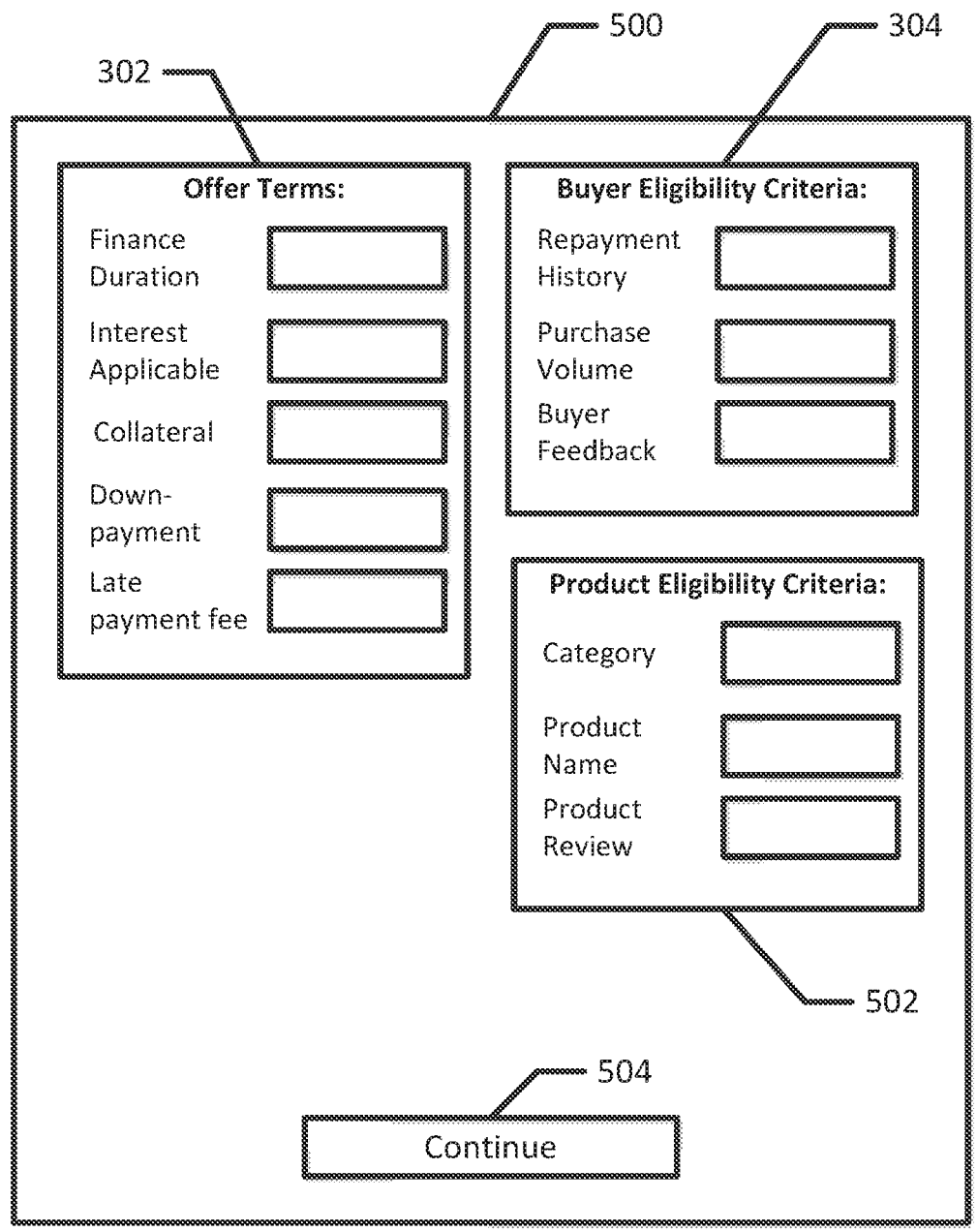
FIG. 5 is an embodiment of a webpage provided by an electronic commerce website to a lender to allow the lender to specify one or more offer terms, buyer eligibility criteria, and/or product eligibility criteria for providing financing offers to users.

FIG. 5 is an embodiment of a webpage 500 provided by an electronic commerce website to a lender to allow the lender to specify one or more offer terms, buyer eligibility criteria, and/or product eligibility criteria for providing financing offers to users in response to the selection of user selectable option "Create Finance Offer" 410 by a lender. Webpage 500 displays set of offer terms 302, set of buyer eligibility criteria 304, and a set of product eligibility criteria 502 that the lender may specify in the financing offer. Set of offer terms 302 and set of buyer eligibility criteria 304 were described in reference to FIG. 3.

Set of product eligibility criteria 502 includes category, product name, and product review fields. For example, the lender may enter into the category field categories of products for which the lender desires to provide financing offers to users (e.g., green energy). The lender may enter into the product name field the particular products for which the lender desires to provide financing offers to users (e.g., name, model, version, etc.). The lender may enter into the product review field a minimum score (e.g., 3.5 stars/5 stars) that a product being sold by a selected merchant must have in order for the lender to provide a financing offer to the user to purchase a product from the merchant. The better a product's review, the more likely the lender may provide a financing offer for the purchase of the product to the user. After the lender is finished with filling in the applicable fields, the lender may select a user selectable option "Continue" 504. In response to a selection of user selectable option "Continue" 504, the electronic commerce website allows the lender to create a financing offer based on particular sellers in accordance with set of offer terms 302, set of buyer eligibility criteria 304, and/or product eligibility criteria 502.

C. Financing Offer Linked to Particular Buyers

Figure 6:
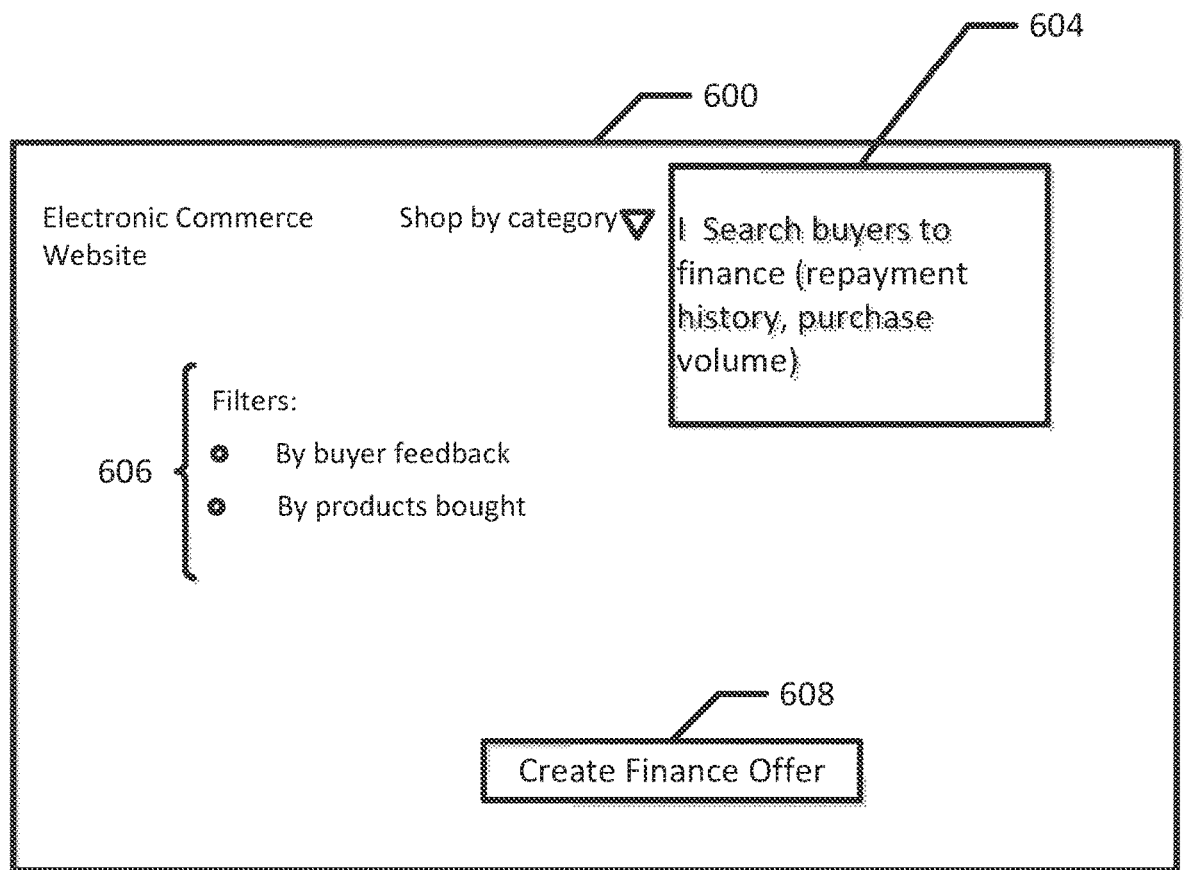
FIG. 6 is an embodiment of a webpage provided by an electronic commerce website to a lender to allow the lender to search for one or more users that the lender desires to provide financing offers to for the purchase of products.

A lender may link a financing offer to buyers. FIG. 6 is an embodiment of a webpage 600 provided by an electronic commerce website to a lender to allow the lender to search for one or more users that the lender desires to provide financing offers to for the purchase of products. As illustrated on webpage 600, the lender may search for buyers to finance by typing in a repayment history or purchase volume into a search box 604. Additionally, the electronic commerce website may provide the lender with options 606 to filter the lender's buyer searches. As illustrated by options 606, the lender may search for buyers by buyer feedback and products bought. A search by buyer feedback provides the lender with information about others' experiences in completing a transaction with the user. The more positive a user's buyer feedback, the more likely the lender may provide a financing offer for the purchase of the product to the user. A search by products bought may provide the lender with information about what users are buying on the electronic commerce website. For example, the lender may search for users who have bought solar panels within the past 12 months and desire to offer financing offers to these users.

These are examples, and the lender may search for users based on other factors, such as performing a search for users who have donated more than a threshold amount to a particular charity. The electronic commerce website may access a database storing information such as a list of users and their donations to charities. If a user has contributed more than a threshold amount to a particular charity, the electronic commerce website may provide the user with the appropriate financing offer from a lender. In this example, the lender may have linked the financing offer to buyers who have satisfied the donation criteria. Additionally, the lender may provide particular users with more beneficial offer terms based on particular factors (e.g., users who have contributed more than a threshold amount to a particular charity or users who are loyal customers to particular merchants).

The electronic commerce website may access a database storing information such as a list of users and their loyalty points with particular merchants. If a user has reached a particular tier based on the number of loyalty points collected by the user, the electronic commerce website may provide the user with the appropriate financing offer from a lender. A financing offer may be a gift (e.g., products from the merchant's store or a meal at particular restaurants). Additionally, the lender may decide to provide users with a financing offer for the purchase of a product and/or to pay for at least a portion of the product without seeking reimbursement.

The lender may then select a user selectable option "Create Finance Offer" 608. In response to a selection of user selectable option "Create a Finance Offer" 608, the electronic commerce website allows the lender to create a financing offer for particular users desiring to purchase products on the electronic commerce website.

Figure 7:
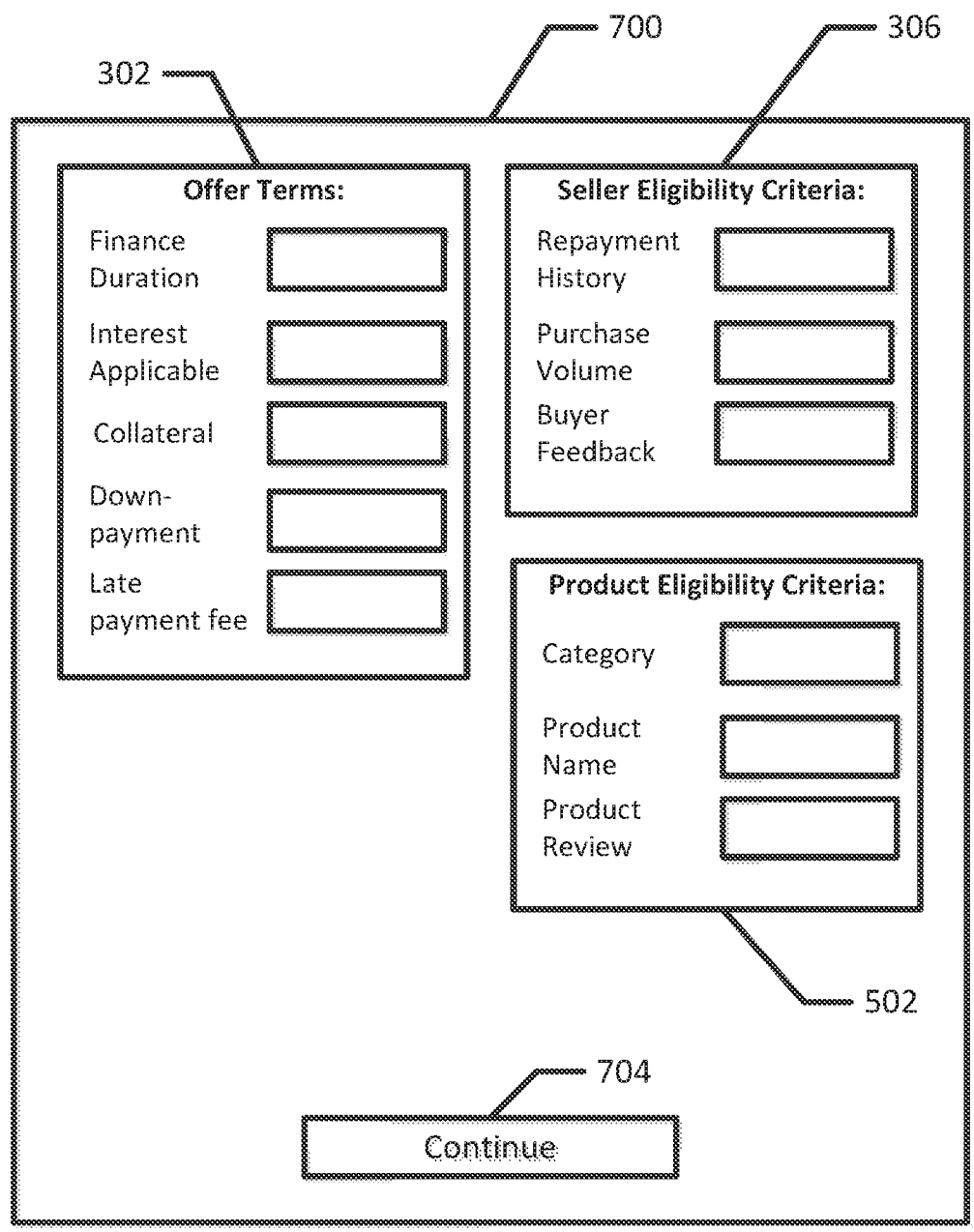
FIG. 7 is an embodiment of a webpage provided by an electronic commerce website to a lender to allow the lender to specify one or more offer terms, seller eligibility criteria, and/or product eligibility criteria for providing financing offers to users.

FIG. 7 is an embodiment of a webpage 700 provided by an electronic commerce website to a lender to allow the lender to specify one or more offer terms, seller eligibility criteria, and/or product eligibility criteria for providing financing offers to users in response to the selection of user selectable option "Create Finance Offer" 608 by a lender. Webpage 700 displays set of offer terms 302, a set of seller eligibility criteria 306, and set of product eligibility criteria 502 that the lender may specify in the financing offer. Set of offer terms 302 and set of seller eligibility criteria 306 were described in reference to FIG. 3, and set of product eligibility criteria 502 was described in reference to FIG. 5. After the lender is finished with filling in the applicable fields, the lender may select a user selectable option "Continue" 704.

In response to a selection of user selectable option "Continue" 704, the electronic commerce website allows the lender to create a financing offer based on particular buyers in accordance with set of offer terms 302, set of seller eligibility criteria 306, and/or product eligibility criteria 502.

It should be understood that webpages 200, 400, and 600 illustrate examples of narrowing down the results of a product, seller, or buyer search. Other ways to narrow down product, seller, or buyer searches are within the scope of the present disclosure. Additionally, it should be understood that webpages 300, 500, and 700 illustrate examples of specifying particular offer terms, buyer eligibility criteria, seller eligibility criteria, and/or product eligibility criteria. Other offer terms, buyer eligibility criteria, seller eligibility criteria, and/or product eligibility criteria are within the scope of the present disclosure.

Although the above discussion may describe the discoverability aspect of a financing offer as being initiated by the lender in regard to reviewing buyers, products, and/or merchants and in creating offers which are displayed upon fulfillment of eligibility criteria, this is not intended to be limiting. This aspect of discoverability may be extended to buyers and/or sellers. For example, a buyer may contact one or more lenders with a pre-defined offer of lending or may publish the lending offer the buyer would like to avail. In such an example, one or more lenders may be notified about such offers and may either start a negotiation with the buyer or approve or reject providing the financing offer to the buyer.

In another example, a seller may reach out to one or more lenders for publishing offers for the seller's products or stores. The seller may request that the lenders provide financing offers to buyers desiring to purchase items (e.g., products or services) from the seller. In such an example, one or more lenders may be notified about the seller's request and start a negotiation with the seller. If the lender starts a negotiation with the seller, the lender may request, for example, that the seller pay the lender a percentage of the total amount of the transaction completed by buyers who accept the lender's financing offer. Additionally, the seller may request that lenders provide buyers with particular interest rates, etc. for their financing offers. A lender may directly approve or reject providing such a financing offer to buyers desiring to purchase items from the seller. Accordingly, buyers may initiate communications with lenders to request financing offers, and sellers may initiate communications with lenders to request lenders to provide financing offers to potential buyers desiring to purchase items from the sellers.

IV. Example System Architecture

Figure 8:
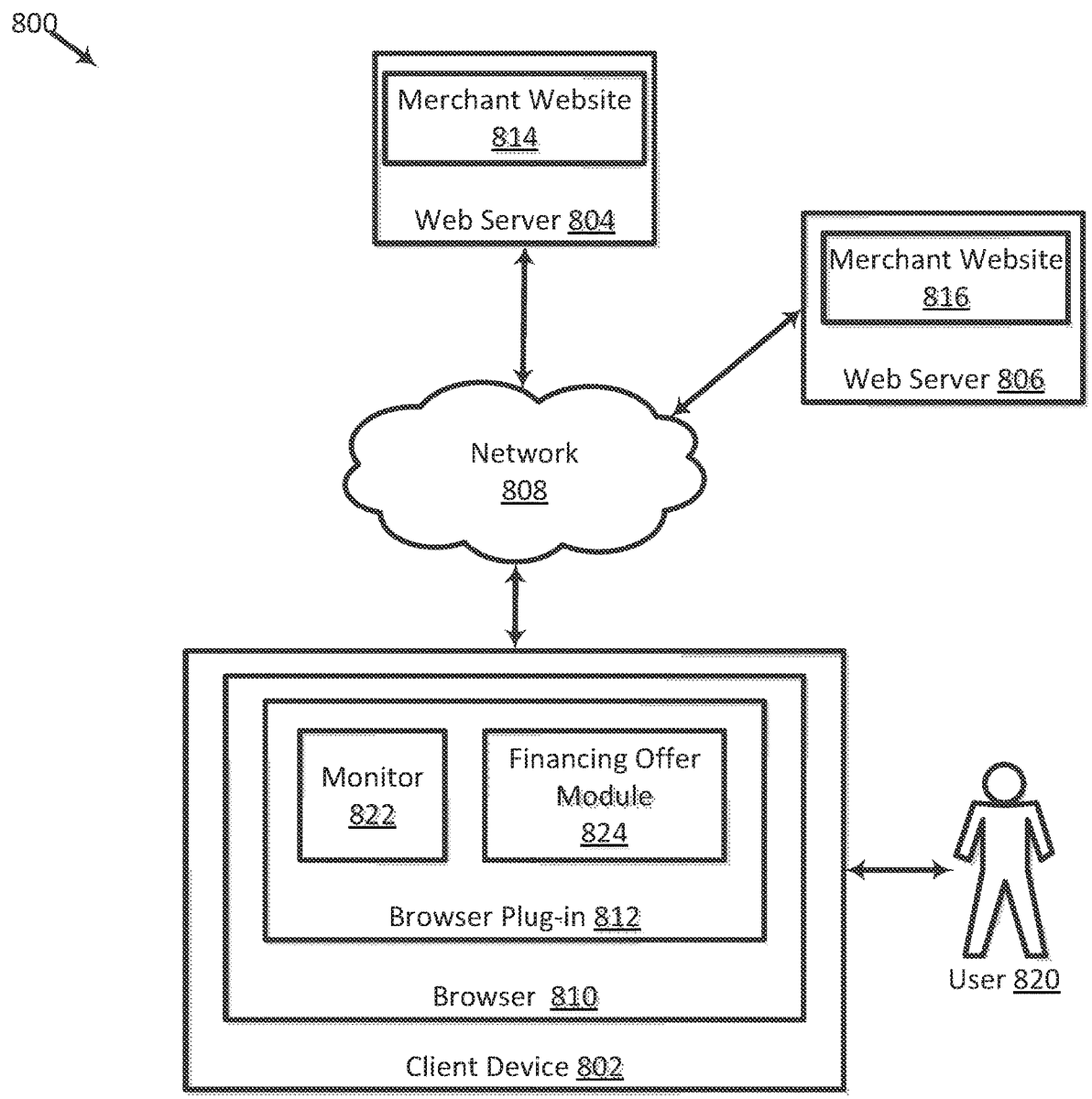
FIG. 8 is a block diagram illustrating an embodiment of a networked system for providing a financing offer based on a user's browsing session.

FIG. 8 is a block diagram illustrating an embodiment of a networked system 800 for providing a financing offer based on a user's browsing session. Networked system 800 may include or implement a plurality of servers and/or software components that operate to perform various transactions or processes. Example servers may include stand-alone and enterprise-class servers operating a server operating system (OS) such as a MICROSOFT® OS, a UNIX® OS, a LINUX® OS, or other suitable server-based OS. It can be appreciated that a server illustrated in FIG. 8 may be deployed in other ways and that the operations performed and/or the services provided by such a server may be combined or separated for a given implementation and may be performed by a greater number of servers. One or more servers may be operated and/or maintained by the same or different entities.

The embodiment of the networked system 800 illustrated in FIG. 8 includes one or more client devices 802, web server 804, and web server 806 in communication over a network 808. Client device 802 includes a browser 810 and a browser plug-in 812. Client device 802 is remote from and communicates with web servers 804 and 806 using browser 810 over network 808. Web server 804 hosts a merchant website 814, and web server 806 hosts a merchant website 816. Client device 802, web server 804, and web server 806 may each include one or more processors, memories, and other appropriate components for executing instructions such as program code and/or data stored on one or more computer readable mediums to implement the various applications, data, and actions described herein. For example, such instructions may be stored in one or more computer readable media such as memories or data storage devices internal and/or external to various components of system 800, and/or accessible over network 808. Network 808 may be implemented as a single network or a combination of multiple networks. For example, in various embodiments, network 808 may include the Internet or one or more intranets, landline networks, wireless networks, and/or other appropriate types of networks.

Client device 802 may be implemented using any appropriate hardware and software configured for wired and/or wireless communication over network 808. For example, in one embodiment, the client device may be implemented as a personal computer (PC), a smart phone, wearable device, laptop computer, and/or other types of computing devices capable of transmitting and/or receiving data, such as an iPad™ from Apple™ or an Android smartphone. Trademarks are the property of their respective owners. Client device 802 may include one or more browser applications which may be used, for example, to provide a convenient interface to permit the user to browse information available over network 808.

For example, in one embodiment, the browser may be implemented as a Web browser configured to view information available over the Internet. Client device 802 may also include one or more toolbar applications which may be used, for example, to provide user-side processing for performing desired tasks in response to operations selected by the user. In one embodiment, the toolbar application may display a user interface in connection with the browser application.

A user 820 may access merchant websites 814 and 816 using browser 810. Merchant websites 814 and 816 may be accessible via a uniform resource locator (URL) to which browser 810 executing on client device 802 points. In an example, merchant website 814 and/or merchant website 816 is provided via a mobile application installed on client device 802. Client device 802 may further include other applications as may be desired in particular embodiments to provide desired features to the user device. For example, the other applications may include security applications for implementing user-side security features, programmatic user applications for interfacing with appropriate application programming interfaces (APIs) over network 808, or other types of applications. Email and/or text applications may also be included, which allow the user to send and receive emails and/or text messages through network 808. Client device 802 may include one or more user and/or device identifiers which may be implemented, for example, as OS registry entries, cookies associated with browser 810, identifiers associated with hardware of client device 802, or other appropriate identifiers, such as a phone number. In one embodiment, the user identifier may be used by browser plug-in 812 to associate the user with a particular account as described herein.

In the example illustrated in FIG. 8, client device 802 runs browser plug-in 812 including a monitor 822 and a financing offer module 824. Browser plug-in 812 and a merchant website (e.g., merchant website 814 or merchant website 816) may communicate with each other and pass information between each other about the user's browsing session, products being viewed by the user on the merchant website, etc. Monitor 822 may monitor a browsing session of user 820 and detect, based on monitoring the browsing session, an action indicating that user 820 will purchase a product from merchant website 814 during the browsing session. Lenders may use the techniques provided in this disclosure to create a financing offer that includes offer terms and criteria to be satisfied by the product to be purchased, user 820, and/or the merchant associated with merchant website 814. If appropriate, financing offer module 824 provides, based on the detected action, user 820 with a user selectable option to accept a financing offer for the purchase of the product. The financing offer is associated with the lender and specifies the set of offer terms. User 820 may review the set of offer terms and decide whether to accept or reject the financing offer. In response to a determination that user 820 has accepted the financing offer, financing offer module 824 may debit the lender account, credit a merchant account associated with merchant website 814, and establish an agreement of the financing offer between user 820 and the lender.

Monitor 822 may also monitor whether the set of offer terms are being met. If an offer term is not met (e.g., late payment by user 820 as specified in the set of offer terms), financing offer module 824 may lower the user's repayment history score, potentially making it more difficult for the user to be provided with more financing offers or more favorable financing offers in the future.

In some examples, users desiring to be offered financing offers from lenders for the purchase of products may opt into allowing the lender to view information about the user (e.g., a repayment history of the user, a purchase volume of the user, and/or buyer feedback). In some examples, a user may purchase a product using a funding instrument associated with the user. The lender may be provided with proof that the user purchased the product (e.g., purchase order, reference number that references the order, etc.). Browser plug-in 812, the electronic commerce website, user 820, or another entity may provide the proof that the user purchased the product. After being provided with the proof of purchase, the lender may provide the purchase amount back to the user and establish an agreement of a financing offer between the user and lender.

Although the functionality of monitor 822 and financing offer module 824 is illustrated as being incorporated into browser plug-in 812, it should be understood that this is not intended to be limiting and the functionality of monitor 822 and/or financing offer module 824 may be incorporated into another component or entity. For example, monitor 822 and/or financing offer module 824 may be incorporated into an electronic commerce website that performs the techniques taught in the present disclosure. Additionally, in some embodiments, monitor 822 and/or financing offer module 824 may be native to browser 810 and not included in a browser plug-in.

V. Example Computing Systems

Figure 9:
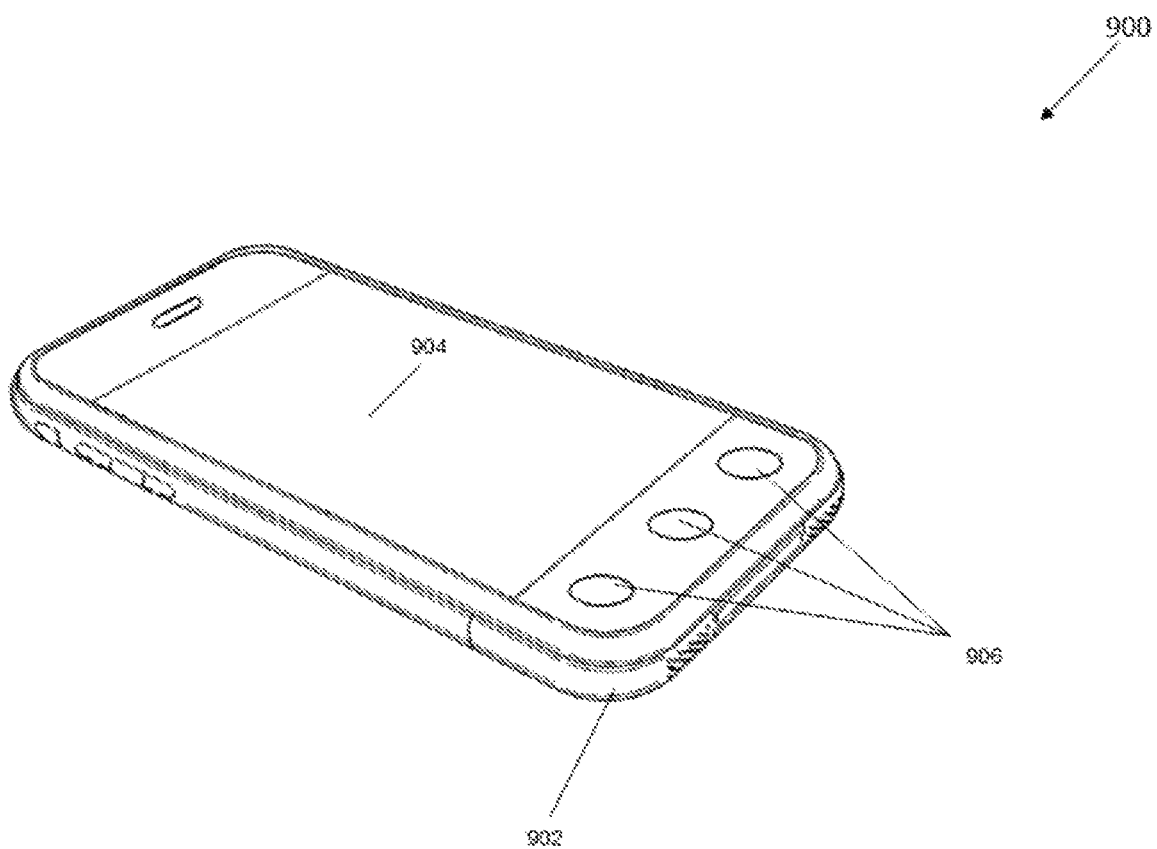
FIG. 9 is a perspective view illustrating an embodiment of a user device.

Referring now to FIG. 9, an embodiment of a user device 900 is illustrated. The user device 900 may be any of the user devices or client devices discussed above. The user device 900 includes a chassis 902 having a display 904 and an input device including the display 904 and a plurality of input buttons 906. The user device 900 may be a portable or mobile phone including a touch screen input device and a plurality of input buttons that allow the functionality discussed above. For example, the user may use user device 900 to browse merchant websites or accept a financing offer. However, a variety of other portable/mobile user devices and/or desktop user devices may be used in the methods and/or process flows discussed above with reference to FIG. 1 without departing from the scope of the present disclosure.

Figure 10:
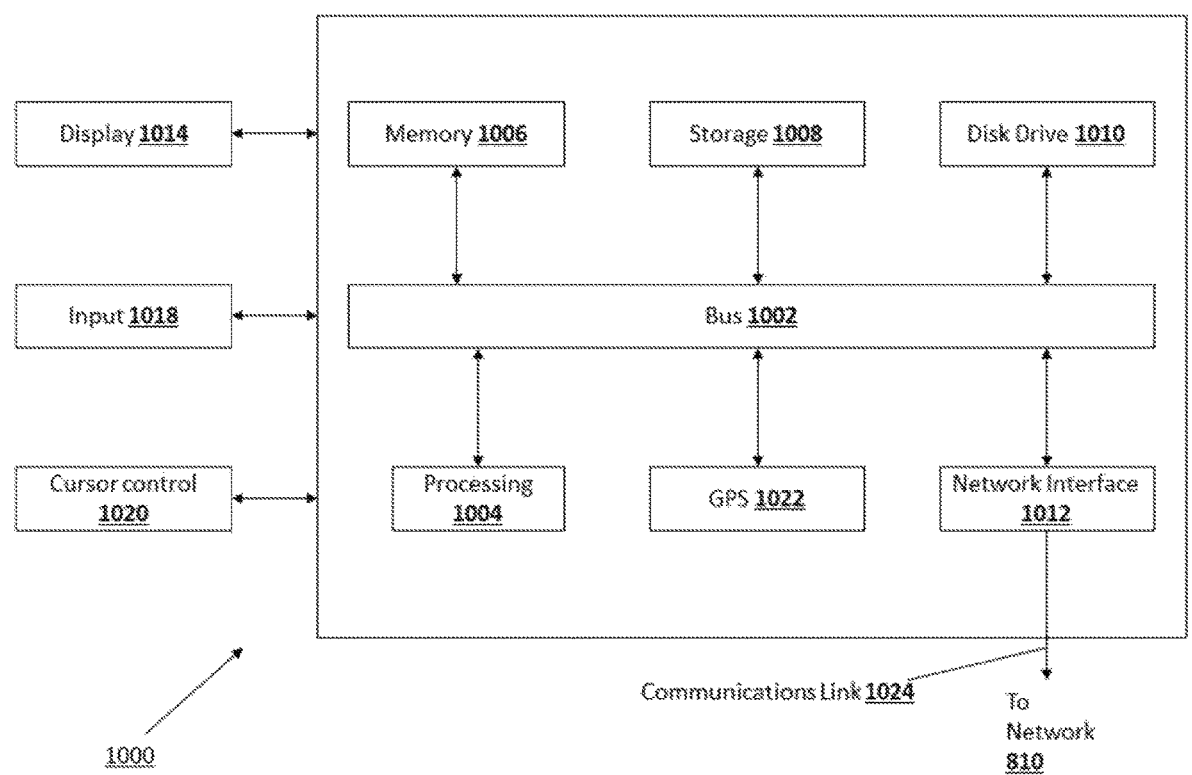
FIG. 10 is a schematic view illustrating an embodiment of a computer system.

Referring now to FIG. 10, an embodiment of a computer system 1000 suitable for implementing, for example, the client devices, the web servers, and/or the electronic commerce website is illustrated, where applicable. It should be appreciated that other devices utilized by users, merchants, and/or system providers in the system discussed above may be implemented as the computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), and/or a location determination component 1022 (e.g., a Global Positioning System (GPS) device as illustrated, a cell tower triangulation device, and/or a variety of other location determination devices known in the art.). If location determination component 1022 is located on the client device, location determination component 1022 may be used to determine the user's location. The location of the user may be used to, for example, determine whether one or more buyer eligibility criteria are satisfied. In one implementation, the disk drive component 1010 may include a database having one or more disk drive components.

In accordance with embodiments of the present disclosure, the computer system 1000 performs specific operations by the processing component 1004 executing one or more sequences of instructions contained in the memory component 1006, such as described herein with respect to the client devices, the merchant devices, and/or the system provider device. Such instructions may be read into the system memory component 1006 from another computer readable medium, such as the static storage component 1008 or the disk drive component 1010. In other embodiments, hard-wired circuitry may be used in place of or in combination with software instructions to implement the present disclosure.

Logic may be encoded in a computer readable medium, which may refer to any medium that participates in providing instructions to the processing component 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that include the bus 1002. In one example, transmission media may take the form of acoustic or light waves, such as those generated during radio wave and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In some embodiments, the computer readable media is non-transitory.

In various embodiments of the present disclosure, execution of instruction sequences to practice the present disclosure may be performed by the computer system 1000. In various other embodiments of the present disclosure, a plurality of the computer systems 1000 coupled by a communications link 1024 to network 810 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communications link 1024 and the network interface component 1012. The network interface component 1012 may include an antenna, either separate or integrated, to enable transmission and reception via the communications link 1024. Received program code may be executed by processing component 1004 as received and/or stored in disk drive component 1010 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components including software, hardware, and/or both without departing from the scope of the present disclosure. Where applicable, the various hardware components and/or software components set forth herein may be separated into sub-components including software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for providing a financing offer based on a user's browsing session, comprising:
   a non-transitory memory storing information about a lender account associated with a lender, wherein the lender provides one or more financing offers to one or more users; and
   one or more hardware processors coupled to the non-transitory memory and configured to execute instructions to cause the system to perform operations comprising:
      receiving, through a network from a first seller of a product, a request for one or more lenders to provide one or more financing offers to a user for purchase of the product, wherein the request is provided by the first seller in response to detecting, using a set of application programming interfaces that communicate with a browser plug-in at a client device that monitors a first browsing session of the user at a first website of the first seller and a second browsing session of the user at a second website of a second seller, a first action at the first website and a second action at the second website indicating that the user is interested in purchasing the product from the first website during the first browsing session;
      sending, through the network, the request to a set of lenders that includes the lender associated with the lender account;
      receiving, through the network, one or more sets of offer terms associated with a financing offer, wherein each set of offer terms is from a respective lender of the set of lenders;
      causing a seller interface to be updated to provide the one or more sets of offer terms;
      receiving, through the network, a financing offer that specifies a set of offer terms, the financing offer being agreed upon between the lender and the first seller;
      causing the browser plug-in to provide a user interface at the client device to provide the user with a user selectable option to accept the financing offer for the purchase of the product from the first website that is provided by a first web server of the first seller to the client device via a browser application; and
      in response to a determination that the user has accepted the financing offer:
         debiting the lender account;
         crediting a seller account associated with the first seller; and
         establishing an agreement of the financing offer between the user and the lender.

2. The system of claim 1, wherein the operations further comprise:
   receiving, through the network from the first seller, a request for the lender to modify an offer term of the set of offer terms; and sending, through the network to a lender device of the lender, the request for the lender to modify the offer term of the set of offer terms.

3. The system of claim 2, wherein the operations further comprise:
receiving, through the network from the lender device of the lender, an approval of the request for the lender to modify the offer term.

4. The system of claim 3, wherein the operations further comprise:
sending, through the network to a seller device of the first seller, an indication that the lender has approved the request for the lender to modify the offer term.

5. The system of claim 2, wherein the operations further comprise:
receiving, through the network from the lender device of the lender, a rejection of the request for the lender to modify of the offer term.

6. The system of claim 1, wherein the user interface is provided by the browser plug-in in a first web page of the first website that is provided by the first web server.

7. The system of claim 2, wherein the operations further comprise:
sending, through the network from the lender device of the lender, a request for the first seller to modify the offer term of the set of offer terms.

8. The system of claim 2, wherein the set of offer terms includes an offer term specifying that the first seller pay the lender a percentage of a purchase amount of the product.

9. The system of claim 2, wherein the operations further comprise:
determining buyer eligibility criteria of the user;
searching a database for lenders that provide financing offers to users that satisfy the buyer eligibility criteria; and
determining, based on the buyer eligibility criteria, the set of lenders that provide financing offers to users.

10. The system of claim 1, wherein the operations further comprise:
determining seller eligibility criteria of the first seller;
searching a database for lenders that provide financing offers to sellers that satisfy the seller eligibility criteria; and
determining, based on the seller eligibility criteria, the set of lenders that provide financing offers associated with sellers.

11. A method of providing a financing offer based on a user's browsing session, comprising:
receiving, through a network from a first seller of a product, a request for one or more lenders to provide one or more financing offers to a user for purchase of the product, wherein the request is provided by the first seller in response to detecting, using a set of application programming interfaces that communicate with a browser plug-in at a client device that monitors a first browsing session of the user at a first website associated with the first seller and a second browsing session of the user at a second website associated with a second seller, a first action at the first website and a second action at the second website indicating that the user is interested in purchasing the product from the first website during the first browsing session;
sending, through the network, the request to a set of lenders;
receiving, through the network, one or more sets of offer terms associated with a financing offer, wherein each set of offer terms is from a lender of the set of lenders;
causing a seller interface to be updated to provide the one or more sets of offer terms;
receiving, through the network, a financing offer that specifies a set of offer terms, the financing offer being agreed upon between a lender from the set of lenders and the first seller;
causing the browser plug-in to provide a user interface at the client device to provide the user with a user selectable option to accept the financing offer for the purchase of the product from the first website that is provided by a first web server of the first seller to the client device via a browser application; and
in response to a determination that the user has accepted the financing offer:
debiting a lender account associated with the lender, wherein the lender provides one or more financing offers to one or more users;
crediting a seller account associated with the first seller; and
establishing an agreement of the financing offer between the user and the lender.

12. The method of claim 11, further comprising:
receiving, through the network from the first seller, a request for the lender to modify an offer term of the set of offer terms; and
sending, through the network to a lender device of the lender, the request for the lender to modify the offer term of the set of offer terms.

13. The method of claim 12, further comprising:
receiving, through the network from the lender device of the lender, an approval of the request for the lender to modify the offer term.

14. The method of claim 13, further comprising:
sending, through the network to a seller device of the first seller, an indication that the lender has approved the request for the lender to modify the offer term.

15. The method of claim 12, further comprising:
receiving, through the network from the lender device of the lender, a rejection of the request for the lender to modify the offer term.

16. The method of claim 15, further comprising:
sending, through the network to a seller device of the first seller, an indication that the lender has rejected the request for the lender to modify the offer term.

17. The method of claim 12, wherein the set of offer terms includes an offer term specifying that the first seller pay the lender a percentage of a purchase amount of the product.

18. The method of claim 11, further comprising:
determining buyer eligibility criteria of the user;
searching a database for lenders that provide financing offers to users that satisfy the buyer eligibility criteria; and
determining, based on the buyer eligibility criteria, the set of lenders that provide financing offers to users.

19. The method of claim 11, further comprising:
determining seller eligibility criteria of the first seller;
searching a database for lenders that provide financing offers to sellers that satisfy the seller eligibility criteria; and
determining, based on the seller eligibility criteria, the set of lenders that provide financing offers associated with sellers.

20. A non-transitory machine-readable medium having stored thereon a plurality of machine-readable instructions executable to cause a machine to perform operations comprising:

receiving, through a network from a first seller of a product, a request for one or more lenders to provide one or more financing offers to a user for purchase of the product, wherein the request is provided by the first seller in response to detecting, using a set of application programming interfaces that communicate with a browser plug-in at a client device that monitors a first browsing session of the user at a first website associated with the first seller and a second browsing session of the user at a second website associated with a second seller, a first action at the first website and a second action at the second website indicating that the user is interested in purchasing the product from the first website during the first browsing session;

sending, through the network, the request to a set of lenders;

receiving, through the network, one or more sets of offer terms associated with a financing offer, wherein each set of offer terms is from a lender of the set of lenders;

causing a seller interface to be updated to provide the one or more sets of offer terms;

receiving, through the network, a financing offer that specifies a set of offer terms, the financing offer being agreed upon between a lender from the set of lenders and the seller;

causing the browser plug-in to provide a user interface at the client device to provide the user with a user selectable option to accept the financing offer for the purchase of the product from the first website that is provided by a first web server of the first seller to the client device via a browser application; and in response to a determination that the user has accepted the financing offer:
  debiting a lender account associated with the lender, wherein the lender provides one or more financing offers to one or more users;
  crediting a seller account associated with the first seller; and
  establishing an agreement of the financing offer between the user and the lender.

* * * * *